(No Model.)
J. T. TAVENNER.
APPARATUS FOR WEIGHING MEAT.
No. 497,614. Patented May 16, 1893.
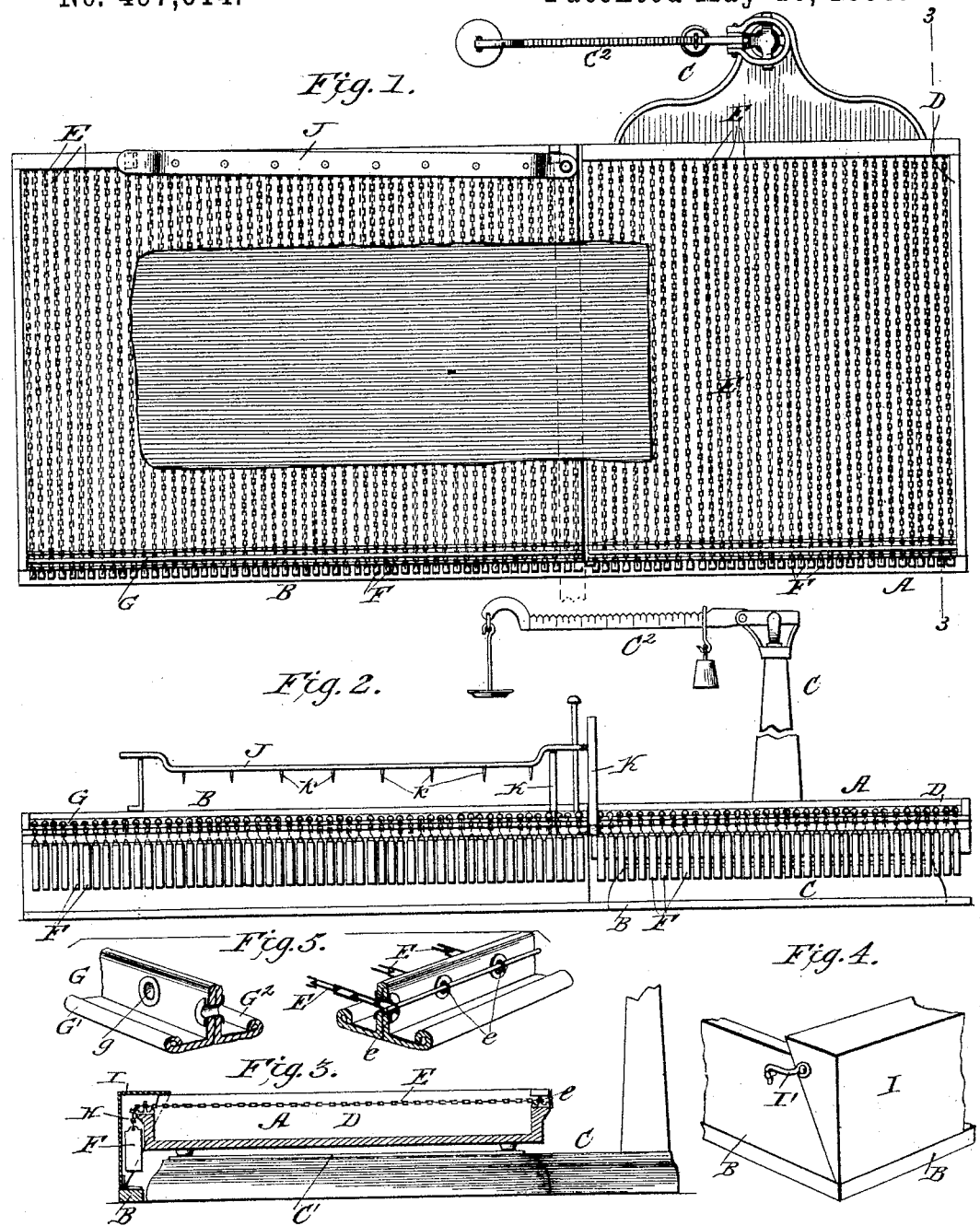
WITNESSES:
Fred G. Dieterich
P. B. Turpin
INVENTOR
John T. Tavenner.
BY Munn & Co
ATTORNEYS.

UNITED STATES PATENT OFFICE.

JOHN T. TAVENNER, OF PARKERSBURG, WEST VIRGINIA.

APPARATUS FOR WEIGHING MEAT.

SPECIFICATION forming part of Letters Patent No. 497,614, dated May 16, 1893.

Application filed December 31, 1892. Serial No. 456,923. (No model.)

*To all whom it may concern:*

Be it known that I, JOHN T. TAVENNER, of Parkersburg, in the county of Wood and State of West Virginia, have invented a new and useful Improvement in Weighing Apparatus, of which the following is a specification.

My invention is an apparatus designed for use in weighing and is in the nature of an improved scale platform or surface for supporting the object being weighed and is especially designed for use in weighing such meats as breakfast bacon, sides of bacon and the like where it is desired to weigh a part of an undivided whole and the invention has for an object to provide simple constructions whereby, one, two or more pounds or other desired quantities may be weighed from the large piece of meat without first cutting off the quantity being weighed and thus avoiding the dissatisfaction and loss resulting from cutting pieces too large or too small.

The invention consists in certain novel constructions and combinations of parts as will be hereinafter described and pointed out in the claims.

In the drawings—Figure 1 is a top plan view and Fig. 2 a front plan view of my improvement with the front or cover removed. Fig. 3 is a cross section on about line 3—3 of Fig. 1 and Figs. 4 and 5 are detail views.

In the illustrated embodiment of my invention I provide a box or frame, and a series of supports such supports being arranged close together. This box or frame and supports constitute what may be termed a scale platform as they serve to directly support the object being weighed; but it should be understood that ordinarily in use the improvement is supported partly upon the usual scale platform and I think it best at this point to call attention to such fact to avoid any misunderstanding because of the likeness of terms. It is preferred to arrange these supports normally in a common plane, to make them depressible, to counterbalance them and also to make them flexible so that they may freely conform to the shape of the article rested upon them. It is also preferred to employ both a weighing section A and an auxiliary section B, the former to receive the portion of the article to be weighed and the latter the rest of the article and each section being constructed and adapted to maintain the weight of the portion of the article above it without such portion affecting the gravity exerted by the other portion upon the other section. The section A is supported in practice upon the scale platform C', and it may be screwed or otherwise secured thereto while the section B is supported independently of the scales, it may be upon the counter alongside of the scales as will be readily understood. The scale C may be an ordinary platform scale but it is preferred to arrange the beam $C^2$ to the left as shown instead of the right as is common in the class of scales shown, the arrangement shown being preferred for economy of space.

The section A has a box or frame D and is provided with a series of supports E arranged across the box or frame and set usually about five-sixteenths of an inch apart. These supports E may be of rawhide, stout cords or other flexible material or they might be rods of brass or the like, supported by tension springs or weights; but the supports are preferably light brass chains such as shown. These supports E are counterbalanced so that they may yield or be depressed but will normally be maintained horizontal and all in a common plane. The counterbalancing of the supports is preferably attained by weights as shown in Figs. 1, 2 and 3. In this construction the supports E are secured at $e$ at one side of the box or frame, extended thence to the opposite side and have the equal weights F connected with their ends, a weight being provided for each support so that they operate entirely independently. In supporting and guiding the supports at their weighted ends I prefer to pass them through perforations $g$ in a plate G and to provide round surfaced guides G' $G^2$ at the inner and outer sides of said plate. To form smooth openings for the supports through plate G, I find it desirable to bush the openings $g$ with lacing eyelets as shown.

The auxiliary section B is provided with supports E similar to and held and actuated in like manner to those of section A. This section it will be seen is not secured to the section A but is entirely independent thereof its function being to support the surplus portion of meat or other article while that of the section A is to support the portion being weighed.

The weights rest in what may be called a receiver or recess H and to protect them from dust and the like I provide a cover or lid I hinged to the section B and adapted to be turned to inclose the weights of both sections A and B, being extended at one end to lap along the section A. This lid I may be secured in closed position by a hook or other fastening I'. When the meat has been weighed it may be cut off without removing it from the apparatus, to facilitate which end I provide a cutter guide J which is a plate removably connected at one end to one side of the section B and may be adjusted into a keeper K at the other side thereof such arrangement of the plate forming a guide in accurately cutting off the weighed meat. Spurs k on the under side of the plate J operate to prevent any slipping of the meat while it is being cut.

The keeper K is formed of two upright posts separated sufficiently to receive the swinging end of the plate J down between them. One of these uprights is shorter than the other so that the plate J can be swung past the upper end of the short post and be stopped by the longer one and then dropped down between the posts as will be understood from Fig. 2.

The operation of the apparatus is simple. A piece of breakfast bacon or side of bacon, may be placed on the supports resting part on section A and part on section B, the part upon each of the supports E exerting its gravity directly upon the same so that the part carried by the supports of the weighing section will operate the scale independently of the other portion so that the excess will not affect the weighing of the part desired. It will also be understood that the meat may be adjusted along the supports E until the desired quantity is ascertained, when the division or line between the supports of sections A and B will indicate the line of cut to divide the weighed from the unweighed quantity. Then the meat may be easily cut by adjusting the cutter guide across it and cutting along the edge of said guide. The central portion of the cutter guide is depressed so that it will reach to and against a piece of bacon even if the latter be very thin.

Having thus described my invention, what I claim as new, and desire to secure by Letters Patent, is—

1. A scale platform for use in weighing parts of an integral body or article comprising a box or frame, and a series of independently depressible supports substantially as described and shown.

2. A scale platform substantially as described comprising a box or frame and a series of adjacent independently depressible counterbalanced supports substantially as set forth.

3. A scale platform substantially as described comprising a box or frame, and a series of flexible depressible counterbalanced supports arranged adjacent to each other all substantially as set forth.

4. A scale platform substantially as described comprising a box or frame, and a series of flexible supports arranged adjacent to each other and normally in a common plane substantially as set forth.

5. A scale platform substantially as described comprising a box or frame, a series of flexible supports secured at one end and stretched across said box or frame, and independent weights connected with the opposite ends of said supports substantially as set forth.

6. A scale platform substantially as described comprising a box or frame having at one side a guide plate perforated for the passage of the supports and provided on opposite sides of said plate with guide surfaces, the flexible supports secured at one side of the box or frame and passed through the perforations in the guide plate and across the inner and outer guide surfaces, and tension devices connected with said supports substantially as set forth.

7. A scale platform substantially as described consisting of two separated boxes or frames provided each with depressible counterbalanced supports arranged and adapted for use substantially as set forth.

8. A scale platform substantially as described consisting of two separated boxes or frames provided each with a series of depressible counterbalanced supports, the supports of the two frames being arranged normally in a common plane substantially as set forth.

9. A scale platform substantially as described comprising a frame having a series of depressible counterbalanced supports, and provided with a cutter guide having spurs on its under side and movably connected with the frame and adapted for use substantially as specified.

10. In a scale platform substantially as described the combination with the series of depressible supports having counterbalancing tension weights, and the box or frame having at one side a receiver or recess for said tension weights, of a guard or cover hinged and adapted to be turned to inclose said weight receiver substantially as set forth.

11. In a scale platform substantially as described, the combination with the weighing section having a series of depressible counterbalanced supports, of the auxiliary section arranged close to or against the weighing section and being also provided with a series of depressible counterbalanced supports substantially as set forth.

12. A scale platform for use in weighing a part of a connected whole consisting of a weighing section arranged and adapted to receive and maintain the weight of the portion being weighed, and an auxiliary section adapted to maintain the weight of the rest of the article, each of said sections being provided with depressible supports substantially as set forth.

13. A scale platform substantially as described comprising the weighing section, the auxiliary section, the supports having tension weights, the lid hinged to the auxiliary section and adapted to be turned to cover the said weights, a keeper for the cutter guide, and the guide connected at one end to the auxiliary section and movable at its other end into and out of the keeper substantially as set forth.

14. The combination substantially as described of a weighing scale, a box or frame supported thereon and having a series of depressible counterbalanced supports, and an auxiliary section supported independently of the scales and also having a series of depressible counterbalanced supports substantially as set forth.

15. A scale platform for use in weighing portions of a connected whole formed with a weighing section to receive the portion being weighed and an auxiliary section to receive the rest of the article, each section being arranged to maintain during the operation of weighing its portion of weight independent of the other section whereby to weigh a portion of a connected or integral body substantially as set forth.

16. A scale platform for use in weighing a part of a connected whole comprising a box or frame, and an adjustable surface consisting of a series of flexible independently depressible counterbalanced supports on which to rest the article being weighed substantially as set forth.

JOHN T. TAVENNER.

Witnesses:
P. B. TURPIN,
SOLON C. KEMON.